US012675911B2

(12) United States Patent
Wakai

(10) Patent No.: US 12,675,911 B2
(45) Date of Patent: Jul. 7, 2026

(54) TRAINING DEVICE, TRAINING METHOD, NON-TRANSITORY COMPUTER READABLE RECORDING MEDIUM STORING TRAINING PROGRAM, CAMERA PARAMETER CALCULATION DEVICE, CAMERA PARAMETER CALCULATION METHOD, AND NON-TRANSITORY COMPUTER READABLE RECORDING MEDIUM STORING CAMERA PARAMETER CALCULATION PROGRAM

(71) Applicant: Panasonic Intellectual Property Corporation of America, Torrance, CA (US)

(72) Inventor: Nobuhiko Wakai, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 274 days.

(21) Appl. No.: 18/630,556

(22) Filed: Apr. 9, 2024

(65) Prior Publication Data

US 2024/0257395 A1 Aug. 1, 2024

Related U.S. Application Data

(63) Continuation of application No. PCT/JP2022/033916, filed on Sep. 9, 2022.

(Continued)

(51) Int. Cl.
*G06T 7/80* (2017.01)

(52) U.S. Cl.
CPC ...... *G06T 7/80* (2017.01); *G06T 2207/20081* (2013.01); *G06T 2207/20084* (2013.01)

(58) Field of Classification Search
CPC . G06T 2207/20084; G06T 2207/20081; G06T 7/80; G06T 7/70;
(Continued)

(56) References Cited

U.S. PATENT DOCUMENTS

| | | | |
|---|---|---|---|
| 10,977,831 B2 * | 4/2021 | Bazin ................... | G06N 3/0464 |
| 2022/0132092 A1 * | 4/2022 | Shibata .................. | H04N 13/25 |

OTHER PUBLICATIONS

Gennery, "Generalized Camera Calibration Including Fish-Eye Lenses", International Journal of Computer Vision 68(3), 2006, pp. 239-266.
(Continued)

*Primary Examiner* — Courtney Joan Nelson
(74) *Attorney, Agent, or Firm* — GREENBLUM & BERNSTEIN, P.L.C.

(57) ABSTRACT

A learning device estimates a camera parameter including a distortion parameter indicative of a distortion of a lens assumed to be symmetrical with respect to the optical axis for a projection function of an incident angle to a camera with a degree of four or less, and a posture parameter by inputting an image to deep neural networks, calculates a plurality of true values by use of the inverse function of the projection function and the true camera parameter, calculates a plurality of estimative values by use of the inverse function and the estimated camera parameter, calculates a network error indicative of an error between the true camera parameter and an estimation result of the deep neural networks, on the basis of sets of the respective true values and the respective estimative values, and learns a parameter of the deep neural networks so as to minimize the network error.

13 Claims, 5 Drawing Sheets

Related U.S. Application Data

(60) Provisional application No. 63/254,773, filed on Oct. 12, 2021.

(58) Field of Classification Search
CPC ... G06T 2207/30244; G06T 5/80; G06T 5/60; G06T 7/001; G06T 7/00; G06T 12/20; G06T 3/047; G06T 1/0007; G06N 3/045; G06N 3/08; G06N 20/00; G06V 10/82; G06V 10/40; G06V 10/20
See application file for complete search history.

(56) References Cited

OTHER PUBLICATIONS

Lopez-Antequera et al., "Deep Single Image Camera Calibration with Radial Distortion", IEEE/CVF Conference on Computer Vision and Pattern Recognition (CVPR), Jun. 2019, pp. 11817-11825.

Tsai, "A Versatile Camera Calibration Technique for High-Accuracy 3D Machine Vision Metrology Using Off-the-shelf TV Cameras and Lenses", IEEE Journal of Robotics And Automation, vol. RA-3, No. 4, Aug. 1987, pp. 323-344.

International Search Report issued in International Pat. Appl. No. PCT/JP2022/033916, dated Oct. 18, 2022, along with an English language translation thereof.

* cited by examiner

FIG.5

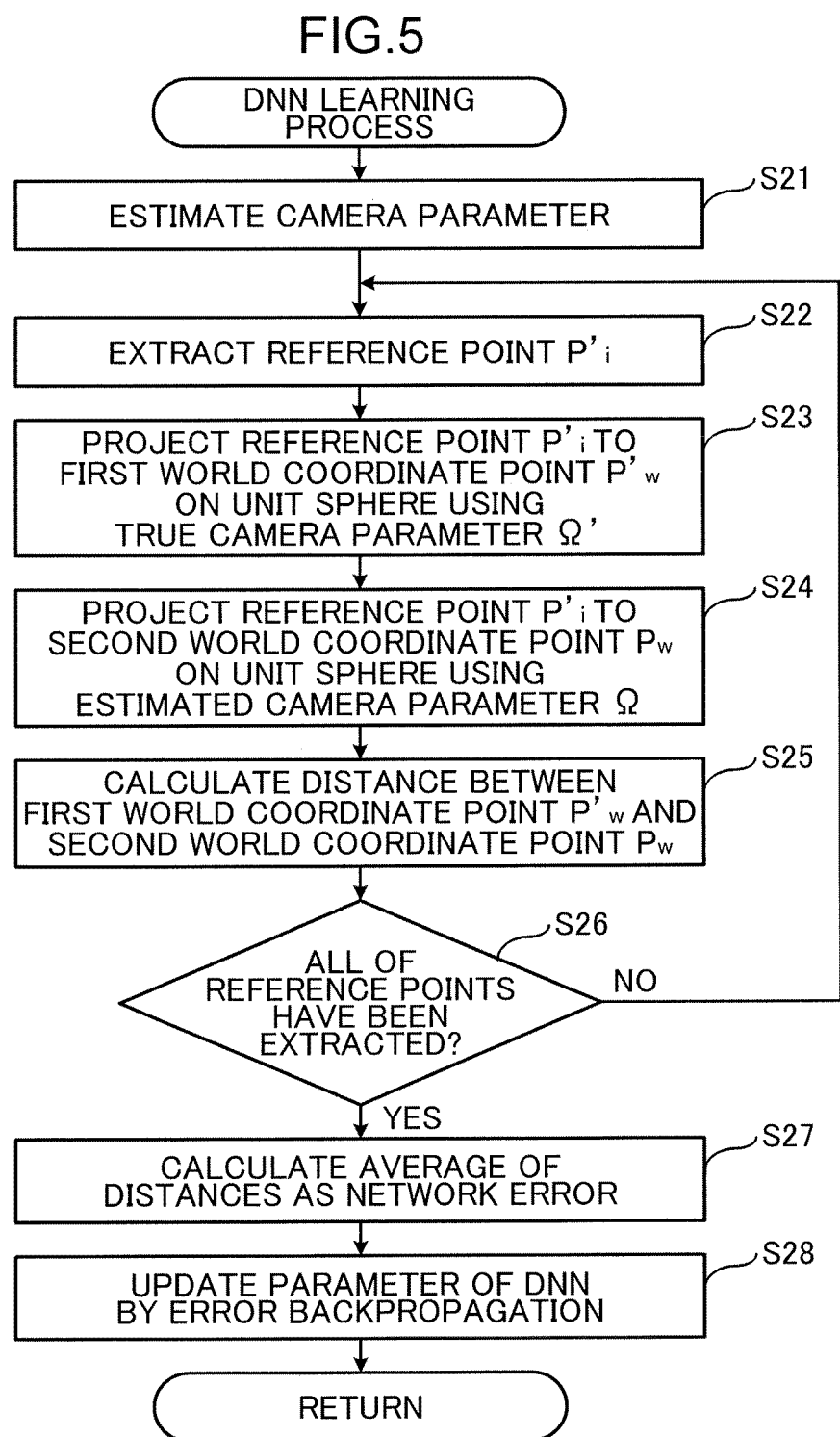

DNN LEARNING
PROCESS

ESTIMATE CAMERA PARAMETER — S21

EXTRACT REFERENCE POINT $P'_i$ — S22

PROJECT REFERENCE POINT $P'_i$ TO
FIRST WORLD COORDINATE POINT $P'_w$
ON UNIT SPHERE USING
TRUE CAMERA PARAMETER $\Omega'$ — S23

PROJECT REFERENCE POINT $P'_i$ TO
SECOND WORLD COORDINATE POINT $P_w$
ON UNIT SPHERE USING
ESTIMATED CAMERA PARAMETER $\Omega$ — S24

CALCULATE DISTANCE BETWEEN
FIRST WORLD COORDINATE POINT $P'_w$ AND
SECOND WORLD COORDINATE POINT $P_w$ — S25

ALL OF
REFERENCE POINTS
HAVE BEEN
EXTRACTED? — S26    NO

YES

CALCULATE AVERAGE OF
DISTANCES AS NETWORK ERROR — S27

UPDATE PARAMETER OF DNN
BY ERROR BACKPROPAGATION — S28

RETURN

TRAINING DEVICE, TRAINING METHOD, NON-TRANSITORY COMPUTER READABLE RECORDING MEDIUM STORING TRAINING PROGRAM, CAMERA PARAMETER CALCULATION DEVICE, CAMERA PARAMETER CALCULATION METHOD, AND NON-TRANSITORY COMPUTER READABLE RECORDING MEDIUM STORING CAMERA PARAMETER CALCULATION PROGRAM

FIELD OF INVENTION

The present disclosure relates to a technique of learning deep neural networks for calculating a camera parameter from an image and a technique of calculating a camera parameter from an image.

BACKGROUND ART

A geometry-based method for performing a camera calibration for a sensing camera or the like requires an association of three-dimensional coordinates in a three-dimensional space with a pixel position of a two-dimensional image. Conventionally, three-dimensional coordinates and a pixel position of a two-dimensional image are associated with each other by taking an image of a repeating pattern having a known shape and detecting an intersection or a center of a circle from the obtained image.

Further, as a method for performing a robust camera calibration against brightness of an image or a subject by use of an input image, there has been suggested a deep learning-based method. The camera calibration is to calculate a camera parameter.

For example, in Non-Patent Literature 1, a camera parameter is calculated by a geometry-based method of associating three-dimensional coordinates in a three-dimensional space with a pixel position of a two-dimensional image by use of a calibration index.

For example, Non-Patent Literature 2 discloses a deep learning-based method of performing a camera calibration from an image.

The method of Non-Patent Literature 1 requires the process of taking an image of a repeating pattern having a known shape, the process of detecting an intersection or a center of a circle from the obtained image, and the process of associating three-dimensional coordinates with a pixel position of the two-dimensional image. Such camera calibration is complicated and may not be easily performable.

In the method of Non-Patent Literature 2, a lens distortion is represented by a simple polynomial including a distortion parameter $k_1$ and a distortion parameter $k_2$ which is calculated from a quadratic function of the distortion parameter $k_1$. Therefore, the method of Non-Patent Literature 2, which has difficulty in properly representing a large lens distortion of a fisheye camera or the like, makes it difficult to perform camera calibration of a camera having a large lens distortion, e.g., a fisheye camera.

Non-Patent Literature 1: R. Y. Tsai, "A versatile Camera Calibration Technique for High-Accuracy 3D Machine Vision Metrology Using Off-the-Shelf TV Cameras and Lenses", IEEE Journal of Robotics and Automation, Volume 3, Number 4, pages 323-344, August 1987

Non-Patent Literature 2: M. Lopez, R. Mari, P. Gargallo, Y. Kuang, J. Gonzalez-Jimenez, and G, Haro, "Deep Single Image Camera Calibration with Radial Distortion", 2019 IEEE/CVF Conference on Computer Vision and Pattern Recognition (CVPR), pages 11817-11825, June 2019

SUMMARY OF THE INVENTION

The present disclosure has been made to solve the above-mentioned problems, and an object thereof is to provide a technique of calculating a camera parameter from an image with high accuracy.

A learning device according to the present disclosure includes: an image acquisition part for acquiring an image taken by a camera; a camera parameter acquisition part for acquiring a true camera parameter of the camera; a learning part for performing a deep learning of deep neural networks using the image acquired by the image acquisition part and the true camera parameter acquired by the camera parameter acquisition part; and an output part for outputting the deep neural networks learned in the learning part, wherein the learning part estimates a camera parameter including a distortion parameter indicative of a distortion of a lens assumed to be symmetrical with respect to the optical axis for a projection function of an incident angle to the camera with a degree of four or less, and a posture parameter indicative of a posture of the camera by inputting the image to the deep neural networks, calculates an inverse function of the projection function in closed-form, calculates a plurality of true values by projecting a plurality of reference points on the image to a world coordinates system by use of the inverse function and the true camera parameter, calculates a plurality of estimative values by projecting the plurality of reference points to the world coordinates system by use of the inverse function and the estimated camera parameter, calculates a network error indicative of an error between the true camera parameter and an estimation result of the deep neural networks about the camera parameter, on the basis of sets of the respective true values and the respective estimative values, and learns a parameter of the deep neural networks so as to minimize the calculated network error.

According to the present disclosure, a camera parameter can be calculated from an image with high accuracy.

BRIEF DESCRIPTION OF THE DRAWINGS

FIG. 5 is a flowchart showing an exemplary DNN learning process in Step 13 in FIG. 4.

DETAILED DESCRIPTION

Underlying Findings for Present Disclosure

Figure 1:
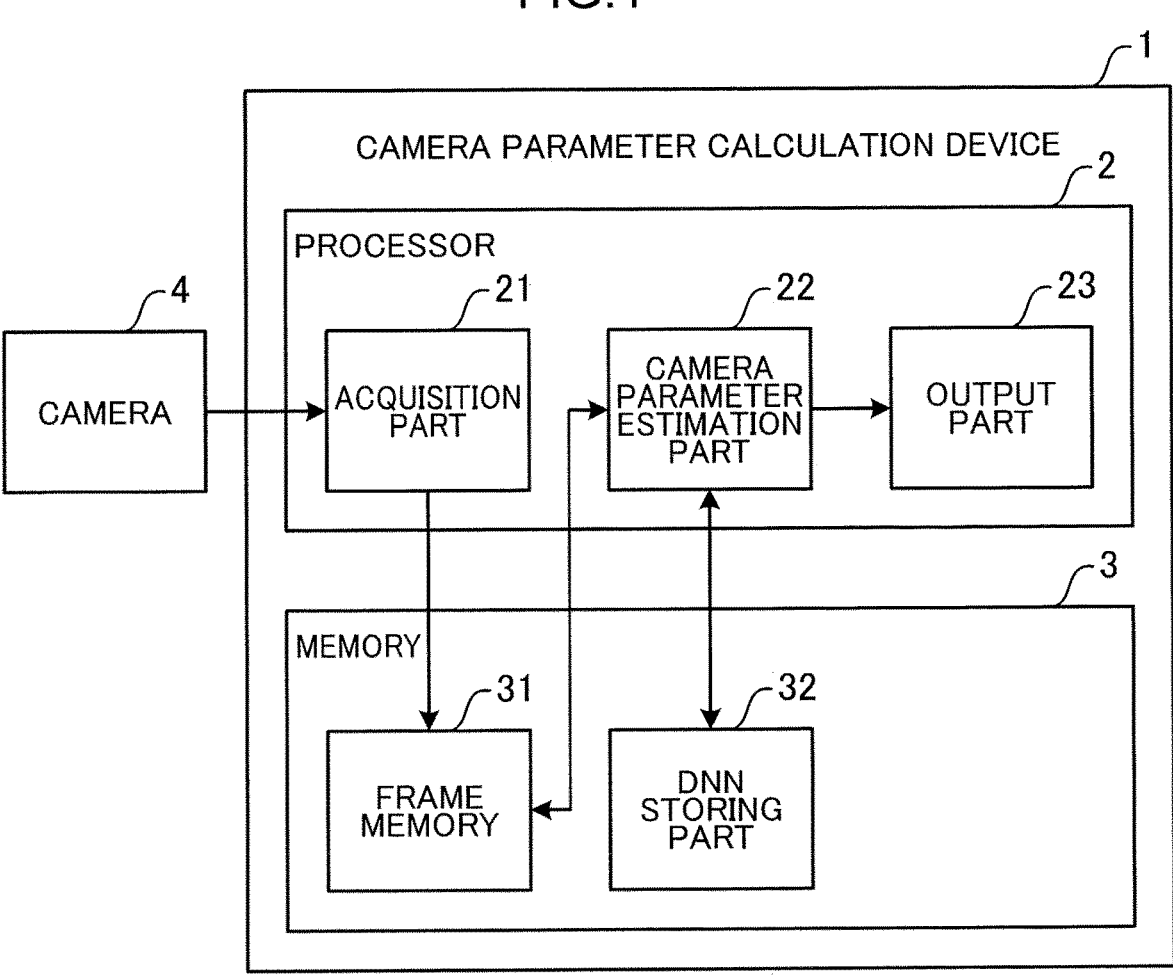
FIG. 1 is a block diagram showing an exemplary structure of a camera parameter calculation system according to an embodiment of the present disclosure.

Recently, sensing has been executed by a camera. However, a camera calibration is required to execute a highly accurate image recognition. In camera calibration of a camera having a large lens distortion such as a fisheye camera, it is difficult to calculate a camera parameter from an image with high accuracy by a conventional deep learning-based camera calibration.

To solve the above-mentioned problems, the following techniques will be disclosed.

(1) A learning device according to an aspect of the present disclosure includes: an image acquisition part for acquiring an image taken by a camera; a camera parameter acquisition part for acquiring a true camera parameter of the camera; a learning part for performing a deep learning of deep neural networks using the image acquired by the image acquisition part and the true camera parameter acquired by the camera parameter acquisition part; and an output part for outputting the deep neural networks learned in the learning part, wherein the learning part estimates a camera parameter including a distortion parameter indicative of a distortion of a lens assumed to be symmetrical with respect to the optical axis for a projection function of an incident angle to the camera with a degree of four or less, and a posture parameter indicative of a posture of the camera by inputting the image to the deep neural networks, calculates an inverse function of the projection function in closed-form, calculates a plurality of true values by projecting a plurality of reference points on the image to a world coordinates system by use of the inverse function and the true camera parameter, calculates a plurality of estimative values by projecting the plurality of reference points to the world coordinates system by use of the inverse function and the estimated camera parameter, calculates a network error indicative of an error between the true camera parameter and an estimation result of the deep neural networks about the camera parameter, on the basis of sets of the respective true values and the respective estimative values, and learns a parameter of the deep neural networks so as to minimize the calculated network error.

In this configuration, since the distortion parameter indicative of a distortion of a lens is represented in the projection function of the incident angle to the camera with the degree of four or less, the inverse function of the projection function can be calculated in closed-form. The reference points in an image coordinate system are projected to the world coordinates system by use of the inverse function and the true camera parameter, and the reference points in the image coordinate system are projected to the world coordinates system by use of the inverse function and the estimated camera parameter; deep neural networks can be thereby learned by use of the network error based on the world coordinates system. Thus, the camera parameter can be calculated from an image with high accuracy by inputting the image to the deep neural networks learned by a deep learning.

(2) In the learning device described in (1) above, a view angle of the camera may be 180 degrees or more.

In this configuration, the camera, which has a view angle of 180 degrees or more, has a large lens distortion. Nevertheless, the camera parameter can be calculated from an image taken by a camera having a large lens distortion with high accuracy by inputting the image taken by the camera having the large lens distortion to the deep neural networks learned by a deep learning.

(3) In the learning device described in (1) or (2) above, the projection function may have a linear term of the incident angle and a cubic term of the incident angle.

In this configuration, the projection function is represented by a third-degree polynomial, thus facilitating a deep learning of deep neural networks. Further, in the case that the degree of the projection function is larger than four, it is difficult to calculate the inverse function of the projection function in closed-form. In this configuration, however, the degree of the projection function is three. Thus, the inverse function of the projection function can be calculated in closed-form.

(4) In the learning device described in (3) above, a coefficient of the linear term of the incident angle may be 1, and a coefficient of the cubic term of the incident angle may fall within a range of $-\frac{1}{6}$ to $\frac{1}{3}$.

This configuration enables representation of all projection systems of fisheye lenses as long as the coefficient of the cubic term of the incident angle falls within the range of $-\frac{1}{6}$ to $\frac{1}{3}$, and can restrict the range of the coefficient (distortion parameter) to be estimated by a deep learning to the range of $-\frac{1}{6}$ to $\frac{1}{3}$.

(5) In the learning device described in any one of (1) to (4) above, the camera parameter may further include a focal length of the camera, and the focal length estimated by the deep neural networks may fall within a range of $\frac{1}{4}$ to $\frac{1}{2}$ of a vertical length of an image sensor of the camera.

In this configuration, since the focal length of a fisheye lens falls within the range of $\frac{1}{4}$ to $\frac{1}{2}$ of the vertical length of the image sensor, the range of the focal length to be estimated by deep learning that is included in the camera parameter of the fisheye camera can be restricted to the range of $\frac{1}{4}$ to $\frac{1}{2}$ of the vertical length of the image sensor.

(6) In the learning device described in any one of (1) to (5) above, the plurality of true values may be a plurality of first world coordinate points obtained by projecting the plurality of reference points to the world coordinates system by use of the inverse function and the true camera parameter, the plurality of estimative values may be a plurality of second world coordinate points obtained by projecting the plurality of reference points to the world coordinates system by use of the inverse function and the estimated camera parameter, and the learning part may calculate the network error on the basis of a distance in each of sets of the respective first world coordinate points and the respective second world coordinate points.

In this configuration, a plurality of first world coordinate points is calculated by projecting the plurality of reference points on the image to the world coordinates system by use of the inverse function and the true camera parameter, and a plurality of second world coordinate points is calculated by projecting the plurality of reference points on the image to the world coordinates system by use of the inverse function and the estimated camera parameter. Therefore, the network error can be calculated on the basis of a distance in each of sets of the respective first world coordinate points and the respective second world coordinate points.

(7) In the learning device described in any one of (1) to (5) above, the plurality of true values may be a plurality of first unit sight vectors obtained by projecting the plurality of reference points to the world coordinates system by use of the inverse function and the true camera parameter, the plurality of estimative values may be a plurality of second unit sight vectors obtained by projecting the plurality of reference points to the world coordinates system by use of the inverse function and the estimated camera parameter, and the learning part may calculate the network error on the basis of an angle in each of sets of the respective first unit sight vectors and the respective second unit sight vectors.

In this configuration, a plurality of first unit sight vectors is calculated by projecting the plurality of reference points on the image to the world coordinates system by use of the inverse function and the true camera parameter, and a plurality of second unit sight vectors is calculated by projecting the plurality of reference points on the image to the world coordinates system by use of the inverse function and the estimated camera parameter. Therefore, the network error can be calculated on the basis of an angle in each of sets of the respective first unit sight vectors and the respective second unit sight vectors.

(8) In the learning device described in any one of (1) to (5) above, the plurality of true values may be a plurality of first unit sight vectors obtained by projecting the plurality of reference points to the world coordinates system by use of the inverse function and the true camera parameter, the plurality of estimative values may be a plurality of second unit sight vectors obtained by projecting the plurality of reference points to the world coordinates system by use of the inverse function and the estimated camera parameter, and the learning part may calculate the network error on the basis of a distance in each of sets of: a plurality of first intersections of the respective first unit sight vectors and a unit sphere; and a plurality of second intersections of the respective second unit sight vectors and the unit sphere.

In this configuration, a plurality of first unit sight vectors is calculated by projecting the plurality of reference points on the image to the world coordinates system by use of the inverse function and the true camera parameter, and a plurality of second unit sight vectors is calculated by projecting the plurality of reference points on the image to the world coordinates system by use of the inverse function and the estimated camera parameter. Therefore, the network error can be calculated on the basis of a distance in each of sets of: a plurality of first intersections of the respective first unit sight vectors and a unit sphere; and a plurality of second intersections of the respective second unit sight vectors and the unit sphere.

The present disclosure can be realized not only as a learning device including the distinctive configurations as described above, but also as a learning method in which distinctive processes corresponding to the distinctive configurations of the learning device are executed. The present disclosure also can be realized as a computer program causing a computer to execute the distinctive processes included in the learning method. Accordingly, other aspects described below also can exert similar advantageous effects to the learning device described above.

(9) A learning method according to another aspect of the present disclosure, by a computer, includes: acquiring an image taken by a camera; acquiring a true camera parameter of the camera; performing a deep learning of deep neural networks using the acquired image and the acquired true camera parameter; and outputting the learned deep neural networks, wherein in the learning of the deep neural networks, a camera parameter including a distortion parameter indicative of a distortion of a lens assumed to be symmetrical with respect to the optical axis for a projection function of an incident angle to the camera with a degree of four or less, and a posture parameter indicative of a posture of the camera is estimated by inputting the image to the deep neural networks, an inverse function of the projection function is calculated in closed-form, a plurality of true values is calculated by projecting a plurality of reference points on the image to a world coordinates system by use of the inverse function and the true camera parameter, a plurality of estimative values is calculated by projecting the plurality of reference points to the world coordinates system by use of the inverse function and the estimated camera parameter, a network error indicative of an error between the true camera parameter and an estimation result of the deep neural networks about the camera parameter is calculated on the basis of sets of the respective true values and the respective estimative values, and a parameter of the deep neural networks is learned so as to minimize the calculated network error.

(10) A learning program according to another aspect of the present disclosure causes a computer to serve as: an image acquisition part for acquiring an image taken by a camera; a camera parameter acquisition part for acquiring a true camera parameter of the camera; a learning part for performing a deep learning of deep neural networks using the image acquired by the image acquisition part and the true camera parameter acquired by the camera parameter acquisition part; and an output part for outputting the deep neural networks learned in the learning part, wherein the learning part estimates a camera parameter including a distortion parameter indicative of a distortion of a lens assumed to be symmetrical with respect to the optical axis for a projection function of an incident angle to the camera with a degree of four or less, and a posture parameter indicative of a posture of the camera by inputting the image to the deep neural networks, calculates an inverse function of the projection function in closed-form, calculates a plurality of true values by projecting a plurality of reference points on the image to a world coordinates system by use of the inverse function and the true camera parameter, calculates a plurality of estimative values by projecting the plurality of reference points to the world coordinates system by use of the inverse function and the estimated camera parameter, calculates a network error indicative of an error between the true camera parameter and an estimation result of the deep neural networks about the camera parameter, on the basis of sets of the respective true values and the respective estimative values, and learns a parameter of the deep neural networks so as to minimize the calculated network error.

(11) A camera parameter calculation device according to another aspect of the present disclosure includes: an image acquisition part for acquiring an image taken by a camera; an estimation part for estimating a camera parameter of the camera by inputting the image acquired by the image acquisition part to deep neural networks learned by a deep learning; and an output part for outputting the camera parameter estimated by the estimation part, wherein in the learning of the deep neural networks, a learning-use image is acquired, a true camera parameter of a camera used for taking the learning-use image is acquired, a camera parameter including a distortion parameter indicative of a distortion of a lens assumed to be symmetrical with respect to the optical axis for a projection function of an incident angle to the camera used for taking the learning-use image with a degree of four or less, and a posture parameter indicative of a posture of the camera is estimated by inputting the learning-use image to the deep neural networks, an inverse function of the projection function is calculated in closed-form, a plurality of true values is calculated by projecting a plurality of reference points on the learning-use image to a world coordinates system by use of the inverse function and the true camera parameter, a plurality of estimative values is calculated by projecting the plurality of reference points to the world coordinates system by use of the inverse function and the estimated camera parameter, a network error indicative of an error between the true camera parameter and an estimation result of the deep neural networks about the camera parameter is calculated on the basis of sets of the respective true values and the respective estimative values, and a parameter of the deep neural networks is learned so as to minimize the calculated network error.

In this configuration, since the distortion parameter indicative of a distortion of a lens is represented in the projection function of the incident angle to the camera with the degree of four or less, the inverse function of the projection function can be calculated in closed-form. The reference points in an image coordinate system are projected to the world coordinates system by use of the inverse function and the true camera parameter, and the reference points in the image coordinate system are projected to the world coordinates system by use of the inverse function and the estimated camera parameter; deep neural networks can be thereby learned by use of the network error based on the world coordinates system. Thus, the camera parameter can be calculated from an image with high accuracy by inputting the image to the deep neural networks learned by a deep learning.

The present disclosure can be realized not only as a camera parameter calculation device including distinctive configurations as described above, but also as a camera parameter calculation method in which distinctive processes corresponding to the distinctive configurations of the camera parameter calculation device are executed. The present disclosure also can be realized as a computer program causing a computer to execute the distinctive processes included in the camera parameter calculation method. Accordingly, other aspects described below also can exert similar advantageous effects to the camera parameter calculation device described above.

(12) A camera parameter calculation method according to another aspect of the present disclosure, by a computer, includes: acquiring an image taken by a camera; estimating a camera parameter of the camera by inputting the image acquired by the image acquisition part to deep neural networks learned by a deep learning; and outputting the camera parameter estimated by the estimation part, wherein in the learning of the deep neural networks, a learning-use image is acquired, a true camera parameter of a camera used for taking the learning-use image is acquired, a camera parameter including a distortion parameter indicative of a distortion of a lens assumed to be symmetrical with respect to the optical axis for a projection function of an incident angle to the camera used for taking the learning-use image with a degree of four or less, and a posture parameter indicative of a posture of the camera is estimated by inputting the learning-use image to the deep neural networks, an inverse function of the projection function is calculated in closed-form, a plurality of true values is calculated by projecting a plurality of reference points on the learning-use image to a world coordinates system by use of the inverse function and the true camera parameter, a plurality of estimative values is calculated by projecting the plurality of reference points to the world coordinates system by use of the inverse function and the estimated camera parameter, a network error indicative of an error between the true camera parameter and an estimation result of the deep neural networks about the camera parameter is calculated on the basis of sets of the respective true values and the respective estimative values, and a parameter of the deep neural networks is learned so as to minimize the calculated network error.

(13) A camera parameter calculation program according to another aspect of the present disclosure causes a computer to serve as: an image acquisition part for acquiring an image taken by a camera; an estimation part for estimating a camera parameter of the camera by inputting the image acquired by the image acquisition part to deep neural networks learned by a deep learning; and an output part for outputting the camera parameter estimated by the estimation part, wherein in the learning of the deep neural networks, a learning-use image is acquired, a true camera parameter of a camera used for taking the learning-use image is acquired, a camera parameter including a distortion parameter indicative of a distortion of a lens assumed to be symmetrical with respect to the optical axis for a projection function of an incident angle to the camera used for taking the learning-use image with a degree of four or less, and a posture parameter indicative of a posture of the camera is estimated by inputting the learning-use image to the deep neural networks, an inverse function of the projection function is calculated in closed-form, a plurality of true values is calculated by projecting a plurality of reference points on the learning-use image to a world coordinates system by use of the inverse function and the true camera parameter, a plurality of estimative values is calculated by projecting the plurality of reference points to the world coordinates system by use of the inverse function and the estimated camera parameter, a network error indicative of an error between the true camera parameter and an estimation result of the deep neural networks about the camera parameter is calculated on the basis of sets of the respective true values and the respective estimative values, and a parameter of the deep neural networks is learned so as to minimize the calculated network error.

Additionally, the present disclosure allows distribution of the program as a non-transitory computer readable recording medium like a CD-ROM, or via a communication network like the Internet. Accordingly, other aspects described below also can exert similar advantageous effects to the learning device or the camera parameter calculation device described above.

(14) A non-transitory computer readable recording medium storing a learning program according to another aspect of the present disclosure causes a computer to serve as: an image acquisition part for acquiring an image taken by a camera; a camera parameter acquisition part for acquiring a true camera parameter of the camera; a learning part for performing a deep learning of deep neural networks using the image acquired by the image acquisition part and the true camera parameter acquired by the camera parameter acquisition part; and an output part for outputting the deep neural networks learned in the learning part, wherein the learning part estimates a camera parameter including a distortion parameter indicative of a distortion of a lens assumed to be symmetrical with respect to the optical axis for a projection function of an incident angle to the camera with a degree of four or less, and a posture parameter indicative of a posture of the camera by inputting the image to the deep neural networks, calculates an inverse function of the projection function in closed-form, calculates a plurality of true values by projecting a plurality of reference points on the image to a world coordinates system by use of the inverse function and the true camera parameter, calculates a plurality of estimative values by projecting the plurality of reference points to the world coordinates system by use of the inverse function and the estimated camera parameter, calculates a network error indicative of an error between the true camera parameter and an estimation result of the deep neural networks about the camera parameter, on the basis of sets of the respective true values and the respective estimative values, and learns a parameter of the deep neural networks so as to minimize the calculated network error.

(15) A non-transitory computer readable recording medium storing a camera parameter calculation program according to another aspect of the present disclosure causes a computer to serve as: an image acquisition part for acquiring an image taken by a camera; an estimation part for estimating a camera parameter of the camera by inputting the image acquired by the image acquisition part to deep neural networks learned by a deep learning; and an output part for outputting the camera parameter estimated by the estimation part, wherein in the learning of the deep neural networks, a learning-use image is acquired, a true camera parameter of a camera used for taking the learning-use image is acquired, a camera parameter including a distortion parameter indicative of a distortion of a lens assumed to be symmetrical with respect to the optical axis for a projection function of an incident angle to the camera used for taking the learning-use image with a degree of four or less, and a posture parameter indicative of a posture of the camera is estimated by inputting the learning-use image to the deep neural networks, an inverse function of the projection function is calculated in closed-form, a plurality of true values is calculated by projecting a plurality of reference points on the learning-use image to a world coordinates system by use of the inverse function and the true camera parameter, a plurality of estimative values is calculated by projecting the plurality of reference points to the world coordinates system by use of the inverse function and the estimated camera parameter, a network error indicative of an error between the true camera parameter and an estimation result of the deep neural networks about the camera parameter is calculated on the basis of sets of the respective true values and the respective estimative values, and a parameter of the deep neural networks is learned so as to minimize the calculated network error.

Each of the embodiments which will be described below represents a specific example of the disclosure. Numerical values, shapes, constituents, steps, and the order thereof described below are mere examples, and thus should not be construed to delimit the disclosure. Further, constituents which are not recited in the independent claims each showing the broadest concept among the constituents in the embodiments are described as selectable constituent. The respective contents are combinable with each other in all the embodiments.

Embodiments

Embodiments of the present disclosure will be described below with reference to the drawings.

FIG. 1 is a block diagram showing an exemplary structure of a camera parameter calculation system according to an embodiment of the present disclosure.

The camera parameter calculation system includes a camera parameter calculation device 1 and a camera 4.

In the embodiment, the camera 4 is a fixed camera which is disposed in a house where a user resides, the user being a recognition target of sensing. The camera 4 takes an image of the user at a predetermined frame rate, and inputs the taken image to the camera parameter calculation device 1 at the predetermined frame rate. The camera 4 is, for example, a fisheye camera (ultra wide-angle camera) of which view angle is 180 degrees or more. The camera 4 may be a wide-angle camera of which view angle is not less than 60 degrees, or may be a narrow angle camera of which view angle is less than 25 degrees.

The camera parameter calculation device 1 is included in a computer having a processor 2, a memory 3, and an unillustrated interface circuit. The processor 2 includes, for example, a central processing unit. The memory 3 includes a storage device that is non-volatile and rewritable, e.g., a flash memory, a hard disk drive, or a solid state drive. The interface circuit includes, for example, a communication circuit.

The camera parameter calculation device 1 may be included in an edge server installed in the house, in a smart speaker installed in the house, or in a cloud server. In the case that the camera parameter calculation device 1 is included in the edge server or the smart speaker, the camera 4 and the camera parameter calculation device 1 are connected with each other through a local area network. In the case that the camera parameter calculation device 1 is included in the cloud server, the camera 4 and the camera parameter calculation device 1 are connected with each other through a wide area network such as the Internet. A part of the configuration of the camera parameter calculation device 1 may be provided in an edge side device and the rest thereof may be provided in a cloud side device.

The processor 2 includes an acquisition part 21, a camera parameter estimation part 22, and an output part 23. The acquisition part 21, the camera parameter estimation part 22, and the output part 23 may do performance when the central processing unit executes a camera parameter calculation program, or may be constituted by dedicated hardware, e.g., an Application Specific Integrated Circuit (ASIC).

The acquisition part 21 acquires the image taken by the camera 4. The acquisition part 21 stores the acquired image in a frame memory 31.

The camera parameter estimation part 22 estimates a camera parameter of the camera 4 by inputting the image acquired by the acquisition part 21 to deep neural networks (hereinafter, also referred to as DNN) learned by deep learning. The camera parameter estimation part 22 reads out DNN from a DNN storing part 32. The camera parameter estimation part 22 calculates the camera parameter from the image read out from the frame memory 31 by DNN learned by deep learning. An example of DNN is convolutional neural networks including a convolutional layer and a pooling layer.

In the learning of DNN, a learning-use image is acquired. Next, a true camera parameter of a camera used for taking the learning-use image is acquired. Next, a camera parameter including a distortion parameter indicative of a distortion of a lens assumed to be symmetrical with respect to the optical axis for a projection function of an incident angle to the camera used for taking the learning-use image with a degree of four or less, and a posture parameter indicative of a posture of the camera is estimated by inputting the learning-use image to DNN. Next, an inverse function of the projection function is calculated in closed-form. Next, a plurality of true values is calculated by projecting a plurality of reference points on the learning-use image to a world coordinates system by use of the inverse function and the true camera parameter. Next, a plurality of estimative values is calculated by projecting the plurality of reference points to the world coordinates system by use of the inverse function and the estimated camera parameter. Next, a network error indicative of an error between the true camera parameter and an estimation result of DNN about the camera parameter is calculated on the basis of sets of the respective true values and the respective estimative values. Next, a parameter of DNN is learned so as to minimize the calculated network error.

The true camera parameter is an exact camera parameter.

The output part 23 outputs the camera parameter estimated by the camera parameter estimation part 22.

The memory 3 includes the frame memory 31 and the DNN storing part 32.

The frame memory 31 stores the image that the acquisition part 21 acquires from the camera 4. The frame memory 31 stores the image acquired by the acquisition part 21 in a time series.

The DNN storing part 32 stores DNN to be used by the camera parameter estimation part 22 beforehand. The DNN storing part 32 stores DNN generated by a learning device 5 described later. DNN may be stored in the DNN storing part 32 at the time of manufacturing of the camera parameter calculation device 1, or may be received from an external server and stored in the DNN storing part 32.

The camera parameter calculation device 1 is not necessarily constituted by a single computer device, and may be constituted by an unillustrated distributed processing system including a terminal device and a server. For example, the terminal device may be provided with the acquisition part 21 and the frame memory 31, and the server may be provided with the DNN storing part 32, the camera parameter estimation part 22, and the output part 23. In this case, reception and transmission of data between the constituents are executed through a communication line connected to the terminal device and the server.

Figure 2:
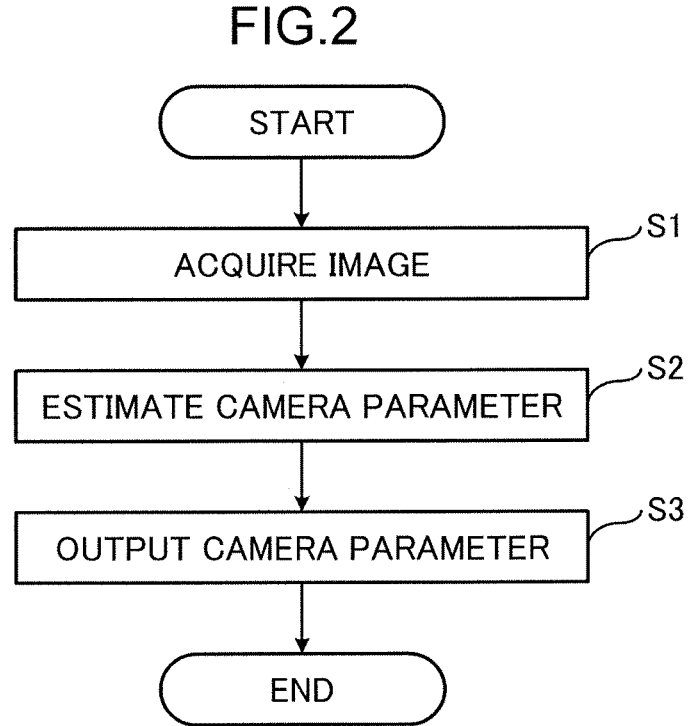
FIG. 2 is a flowchart showing an exemplary camera parameter calculation of a camera parameter calculation device according to the embodiment of the present disclosure.

FIG. 2 is a flowchart showing an exemplary camera parameter calculation of the camera parameter calculation device 1 according to the embodiment of the present disclosure. The operation of the camera parameter calculation device 1 will be described below with reference to FIG. 2. The camera parameter calculation is executed when the camera 4 is installed, and executed thereafter periodically, e.g., every week or every month.

First, in Step S1, the acquisition part 21 acquires an image (fisheye image) taken by the camera 4. The acquisition part 21 stores the acquired image in the frame memory 31.

Next, in Step S2, the camera parameter estimation part 22 reads out the image from the frame memory 31, and estimates a camera parameter by inputting the read-out image to DNN learned beforehand. The learning method of DNN will be described later.

Next, in Step S3, the output part 23 outputs the camera parameter estimated by the camera parameter estimation part 22.

The procedure described above enables a calibration of the camera 4 for sensing. Particularly, the embodiment is useful for camera calibration of a camera 4 with a large distortion, e.g., a fisheye camera.

Next, a learning device for performing a learning of DNN used in the camera parameter estimation part 22 will be described.

Figure 3:
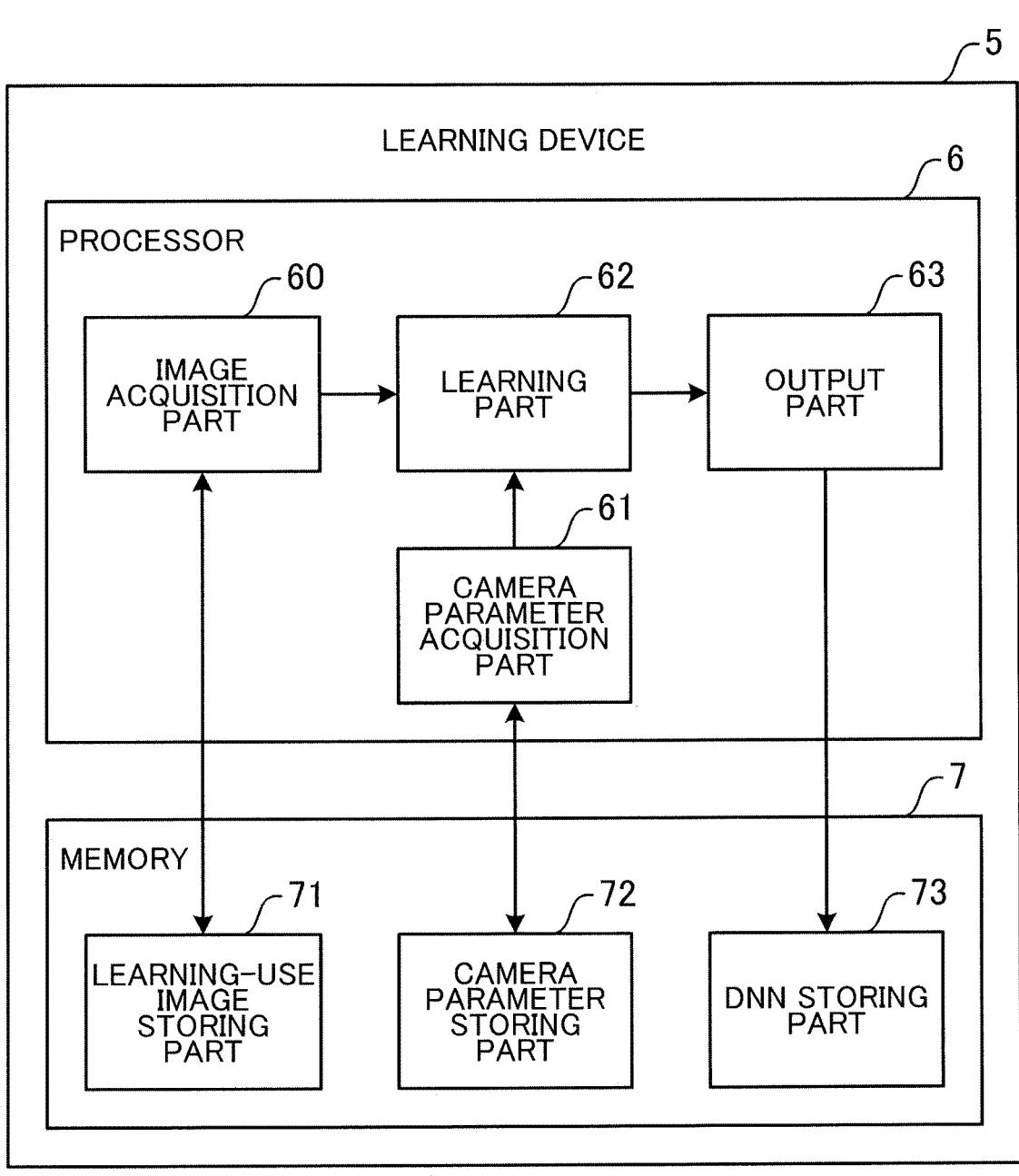
FIG. 3 is a block diagram showing an exemplary structure of a learning device according to the embodiment of the present disclosure.

FIG. 3 is a block diagram showing an exemplary structure of a learning device 5 according to the embodiment of the present disclosure.

The learning device 5 is included in a computer having a processor 6, a memory 7, and an unillustrated interface circuit. The processor 6 includes, for example, a central processing unit. The memory 7 includes a storage device that is non-volatile and rewritable, e.g., a flash memory, a hard disk drive, or a solid state drive. The interface circuit includes, for example, a communication circuit.

The learning device 5 may be included in a cloud server, or in a personal computer.

The processor 6 includes an image acquisition part 60, a camera parameter acquisition part 61, a learning part 62, and an output part 63. The image acquisition part 60, the camera parameter acquisition part 61, the learning part 62, and the output part 63 may do performance when the central processing unit executes a learning program, or may be constituted by dedicated hardware, e.g., an ASIC.

The memory 7 includes a learning-use image storing part 71, a camera parameter storing part 72, and a DNN storing part 73.

The learning-use image storing part 71 stores a plurality of learning-use images taken by a camera beforehand. The learning-use image is used in the learning of DNN. The camera for obtaining the learning-use image is identical to the camera 4. The learning-use image is a fisheye image, which is taken by a fisheye camera in advance. The learning-use image may be generated by executing computer graphics (CG) processing to a panoramic image by use of the camera parameter of the fisheye camera.

The camera parameter storing part 72 stores a true camera parameter of a camera beforehand. The true camera parameter is used in the learning of DNN. The true camera parameter is a camera parameter of the camera used to obtain the learning-use image. The true camera parameter may be a camera parameter used in the execution of the CG processing to the learning-use image. The camera parameter storing part 72 stores the true camera parameter associated with the learning-use image. The camera parameter includes an extrinsic parameter for the posture (rotation and translation with respect to a world coordinate reference) of the camera, and an intrinsic parameter for the focal length and the lens distortion.

The image acquisition part 60 acquires a learning-use image taken by the camera. The image acquisition part 60 reads out the learning-use image from the learning-use image storing part 71. In the embodiment, the image acquisition part 60 acquires from the learning-use image storing part 71 the learning-use image stored therein beforehand, but the present disclosure is not particularly limited to this. The image acquisition part 60 may acquire a learning-use image from an external server. In this case, the image acquisition part 60 may receive the learning-use image from the external server. Alternatively, the image acquisition part 60 may acquire a learning-use image from a camera connected to the learning device 5.

The camera parameter acquisition part 61 acquires the true camera parameter of the camera. The camera parameter acquisition part 61 reads out the true camera parameter from the camera parameter storing part 72. In the embodiment, the camera parameter acquisition part 61 acquires from the camera parameter storing part 72 the true camera parameter stored therein beforehand, but the present disclosure is not particularly limited to this. The camera parameter acquisition part 61 may acquire a true camera parameter from an external server. In this case, the camera parameter acquisition part 61 may receive the true camera parameter from the external server. Alternatively, the camera parameter acquisition part 61 may acquire a true camera parameter input by an operator.

The learning part 62 performs a deep learning of DNN using the learning-use image acquired by the image acquisition part 60 and the true camera parameter acquired by the camera parameter acquisition part 61.

The learning part 62 estimates a camera parameter including a distortion parameter indicative of a distortion of a lens assumed to be symmetrical with respect to the optical axis for a projection function of an incident angle to the camera with a degree of four or less, and a posture parameter indicative of the posture of the camera by inputting the learning-use image to DNN. The learning part 62 calculates an inverse function of the projection function in closed-form. The learning part 62 calculates a plurality of true values by projecting a plurality of reference points on the learning-use image to a world coordinates system by use of the inverse function and the true camera parameter. The learning part 62 calculates a plurality of estimative values by projecting the plurality of reference points to the world coordinates system by use of the inverse function and the estimated camera parameter. The learning part 62 calculates a network error indicative of an error between the true camera parameter and an estimation result of DNN about the camera parameter on the basis of sets of the respective true values and the respective estimative values.

The plurality of true values is a plurality of first world coordinate points obtained by projecting the plurality of reference points to the world coordinates system by use of the inverse function and the true camera parameter. The plurality of estimative values is a plurality of second world coordinate points obtained by projecting the plurality of reference points to the world coordinates system by use of the inverse function and the estimated camera parameter. The learning part 62 calculates the network error on the basis of a distance in each of sets of the respective first world coordinate points and the respective second world coordinate points.

The learning part 62 learns a parameter of DNN so as to minimize the calculated network error.

In the embodiment, the plurality of true values may be a plurality of first unit sight vectors obtained by projecting the plurality of reference points to the world coordinates system by use of the inverse function and the true camera parameter. Further, the plurality of estimative values may be a plurality of second unit sight vectors obtained by projecting the plurality of reference points to the world coordinates system by use of the inverse function and the estimated camera parameter. In this case, the learning part 62 may calculate the network error on the basis of an angle in each of sets of the respective first unit sight vectors and the respective second unit sight vectors.

In the embodiment, the plurality of true values may be a plurality of first unit sight vectors obtained by projecting the plurality of reference points to the world coordinates system by use of the inverse function and the true camera parameter. The plurality of estimative values may be a plurality of second unit sight vectors obtained by projecting the plurality of reference points to the world coordinates system by use of the inverse function and the estimated camera parameter. In this case, the learning part 62 may calculate the network error on the basis of a distance in each of sets of: a plurality of first intersections of the respective first unit sight vectors and a unit sphere; and a plurality of second intersections of the respective second unit sight vectors and the unit sphere.

The output part 63 outputs DNN learned by the learning part 62. The output part 63 outputs DNN to the DNN storing part 73.

The DNN storing part 73 stores DNN learned by the learning part 62. In the embodiment, the output part 63 stores DNN learned by the learning part 62 into the DNN storing part 73, but the present disclosure is not particularly limited to this. The output part 63 may output DNN learned by the learning part 62 to an external server. In this case, the output part 63 may transmit DNN to the external server.

Next, the learning process of the learning device 5 will be described with reference to the drawings.

Figure 4:
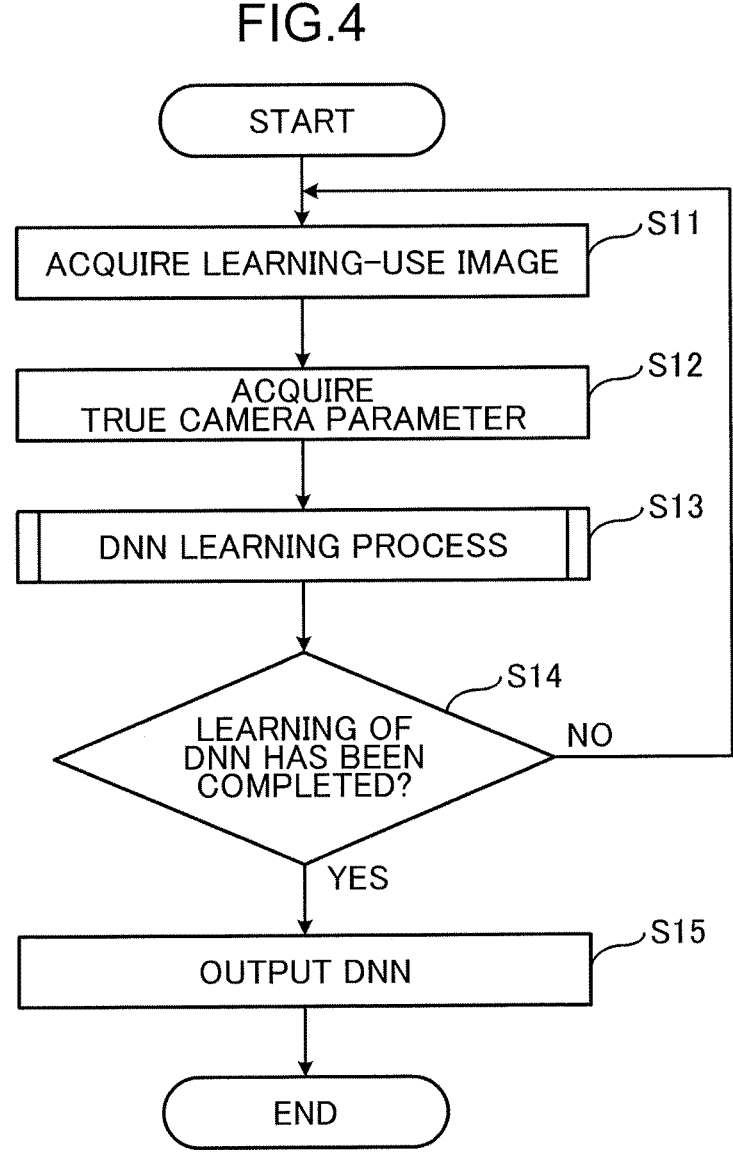
FIG. 4 is a flowchart showing an exemplary learning process of the learning device according to the embodiment of the present disclosure.

FIG. 4 is a flowchart showing an exemplary learning process of the learning device 5 according to the embodiment of the present disclosure. The operation of the learning device 5 will be described below with reference to FIG. 4.

First, in Step S11, the image acquisition part 60 acquires a learning-use image used for the learning of DNN.

Next, in Step S12, the camera parameter acquisition part 61 acquires a true camera parameter $\Omega'$.

Next, in Step S13, the learning part 62 performs the learning of DNN (DNN learning process) by using the learning-use image and the true camera parameter $\Omega'$.

The learning part 62 calculates an error between the true camera parameter and the estimated camera parameter. A camera parameter represents a projection relationship from a world coordinate to an image coordinate or a projection relationship from an image coordinate to a world coordinate. A world coordinate resulting from conversion of an image coordinate corresponds to a unit sight vector or a world coordinate on a unit sphere because the scale is unknown.

The learning part 62 projects a reference point (e.g., a pixel) on the learning-use image to a first world coordinate point on a unit sphere using the true camera parameter. The learning part 62 projects the reference point on the learning-use image to a second world coordinate point on the unit sphere using the estimated camera parameter. The learning part 62 calculates a distance between the first world coordinate point and the second world coordinate point. The learning part 62 calculates distances between first world coordinate points and second world coordinate points from all reference points on the learning-use image, and calculates an average of the calculated distances as the network error (loss).

A method for calculating the network error (loss) will be described by taking the method for calculating Bearing loss in Non-Patent Literature 2 as an example.

In this regard, the DNN learning process in Step S13 in FIG. 4 will be described.

FIG. 5 is a flowchart showing an exemplary DNN learning process in Step 13 in FIG. 4.

First, in Step S21, the learning part 62 estimates a camera parameter by inputting a learning-use image to DNN. DNN extracts an image feature from the convolutional layer or the like, and outputs each of finally estimated camera parameters. For example, DNN outputs four camera parameters: the tilt angle $\theta$; the roll angle $\psi$; the focal length f; and the distortion parameter $k_1$. The details of the camera parameter will be described later. For a brief explanation, in the description below, the learning part 62 estimates the four camera parameters described above.

A camera parameter other than the estimated camera parameters (i.e., non-estimated camera parameter) may be generated from a true camera parameter. Specifically, in the case that the number of the true camera parameters is greater than the number of the estimated camera parameters, a value for the true camera parameter may be used as a value for a camera parameter that has not been estimated.

Next, in Step S22, the learning part 62 extracts a reference point $P'_i$ among N reference points on the learning-use image. In the case that a reference point is represented by a pixel, N is equal to the number of pixels of the learning-use image, and is represented by the product of the number of pixels in a height direction of the image and the number of pixels in a width direction of the image.

Next, in Step S23, the learning part 62 projects the reference point $P'_i$ to a first world coordinate point $P'_w$ on a unit sphere using the true camera parameter $\Omega'$.

Next, in Step S24, the learning part 62 projects the reference point $P'_i$ to a second world coordinate point $P_w$ on the unit sphere using the estimated camera parameter $\Omega$.

Next, in Step S25, the learning part 62 calculates a Euclidean distance between the first world coordinate point $P'_w$ and the second world coordinate point $P_w$ projected onto the unit sphere.

Next, in Step S26, the learning part 62 determines whether or not all of the reference points on the learning-use image have been extracted. In the case that it is determined that all of the reference points have not been extracted (NO in Step S26), the process returns to Step S22. The learning part 62 then extracts another unextracted reference point $P'_i$ from the reference points on the learning-use image.

On the other hand, in the case that it is determined that all of the reference points have been extracted (YES in Step S26), the learning part 62 calculates an average of the calculated distances as the network error in Step S27. The learning part 62 may calculate the square of the average of the calculated distances as the network error. Alternatively, the learning part 62 may calculate the Huber loss of the calculated distances as the network error. The Huber loss is a loss function that gives a squared error for an absolute error of less than 0.5 and gives a linear error for an absolute error of not less than 0.5.

Next, in Step S28, the learning part 62 updates the parameter of DNN by error backpropagation using the calculated network error. The error backpropagation is optimized by use of the stochastic gradient descent or the like.

The learning part 62 may convert a reference point on the learning-use image to a first unit sight vector using the true camera parameter. The learning part 62 may convert a reference point on the learning-use image to a second unit sight vector using the estimated camera parameter. The learning part 62 may calculate an angle between the first unit sight vector and the second unit sight vector. The learning part 62 may calculate angles between first unit sight vectors and second unit sight vectors for all of the reference points on the learning-use image, and calculate an average of the calculated angles as the network error (loss).

The learning part 62 may calculate a first intersection of a first unit sight vector and a unit sphere having the center at the camera. The learning part 62 may calculate a second intersection of a second unit sight vector and the unit sphere. The learning part 62 may calculate a Euclidean distance between the first intersection and the second intersection on the unit sphere. The learning part 62 may calculate Euclidean distances between first intersections and second intersections for all of the reference points on the learning-use image, and calculate an average of the calculated Euclidean distances as the network error (loss). This network error is referred to as Bearing loss in Non-Patent Literature 2.

The learning part 62 may project world coordinate points (e.g., 10,000 points) on the unit sphere to first image coordinate points on the image using the true camera parameter. The learning part 62 may project the world coordinate points on the unit sphere to second image coordinate points on the image using the estimated camera parameter. The learning part 62 may calculate a distance between the first image coordinate point and the second image coordinate point. The learning part 62 may calculate distances between first image coordinate points and second image coordinate points for all of the world coordinate points on the unit sphere, and calculate an average of the calculated distances as the network error (loss).

Reference is back to FIG. 4. Next, in the step S14, the learning part 62 determines whether or not the learning of DNN has been completed. For example, the learning part 62 determines that the learning of DNN has been completed in the case that the number of updatings of the parameter of DNN is greater than a threshold, and determines that the learning of DNN has not been completed in the case that the number of updatings of the parameter of DNN is not greater than the threshold. The threshold is, for example, 10,000 times.

Alternatively, the learning part 62 may determine that the learning of DNN has been completed in the case that the network error is less than a threshold, and determine that the learning of DNN has not been completed in the case that the network error is not less than the threshold. In the case that the network error is the average of the distances on the unit sphere, the threshold is, for example, 0.1. In the case that the network error is the average of the angles between the unit sight vectors, the threshold is, for example, 0.01. In the case that the network error is the average of the distances between the image coordinate points, the threshold is, for example, three pixels.

In the case that the learning of DNN is determined not to have been completed (NO in Step S14), the process returns to Step S11. In Step S11, the image acquisition part 60 acquires another learning-use image.

On the other hand, in the case that the learning of DNN is determined to have been completed (YES in Step S14), the output part 63 outputs DNN learned by the learning part 62 in Step S15. The output part 63 stores DNN into the DNN storing part 73.

Next, an exemplary camera parameter in the present disclosure will be described below. The conversion formula from the world coordinates system to the image coordinate system is represented by the following equations (1) to (4). The camera parameter is a parameter of a projection formula for projecting a world coordinate to an image coordinate. $\Gamma(\eta)$ in the equation (3) is a projection function representing a lens distortion. $\eta$ denotes the incident angle.

[Formula 1]

$$\begin{bmatrix} x \\ y \\ 1 \end{bmatrix} = \begin{bmatrix} \gamma/d_x & 0 & C_x & 0 \\ 0 & \gamma/d_y & C_y & 0 \\ 0 & 0 & 0 & 1 \end{bmatrix} \begin{bmatrix} X_e \\ Y_e \\ Z_e \\ 1 \end{bmatrix} \tag{1}$$

$$\begin{bmatrix} X_e \\ Y_e \\ Z_e \\ 1 \end{bmatrix} = \begin{bmatrix} r_{11} & r_{12} & r_{13} & T_X \\ r_{21} & r_{22} & r_{23} & T_Y \\ r_{31} & r_{32} & r_{33} & T_Z \\ 0 & 0 & 0 & 1 \end{bmatrix} \begin{bmatrix} X \\ Y \\ Z \\ 1 \end{bmatrix} \tag{2}$$

$$\gamma = \Gamma(\eta) \tag{3}$$

$$\eta = \arctan\left( \frac{\sqrt{X_e^2 + Y_e^2}}{Z_e} \right) \tag{4}$$

Here, (X, Y, Z) denotes world coordinate values, and (x, y) denotes image coordinate values; $(C_x, C_y)$ represents a principal point of the camera in an image coordinate system; $r_{11}$ to $r_{33}$ denote components of a 3×3 rotation matrix R representing rotation with respect to a reference in the world coordinates system; $(T_X, T_Y, T_Z)$ represents a translation vector with respect to the reference in the world coordinates system; and $d_x$ and $d_y$ are pixel pitches of an image sensor of a camera in a lateral direction and a vertical direction, respectively. In the equations (1) to (4), $d_x$, $d_y$, $C_x$, $C_y$, $r_{11}$ to $r_{33}$, $T_X$, $T_Y$, and $T_Z$ are camera parameters.

The equations (1) to (4) represent a conversion from (X, Y, Z) to (x, y). In the case of a conversion from (x, y) to (X, Y, Z) on a unit sphere, an inverse function or an inverse matrix for the equations (1) to (4) are used for the conversion. The rotation matrix is regular and the inverse matrix thereof is always calculable. A 4×4 matrix including the translation vector is al so regular. Even in the case that the equations (1) to (4) concern arctan and four arithmetic operations, the inverse function for the equations (1) to (4) is calculable. An inverse trigonometric function such as arctan is calculable as long as the domain is appropriate. Therefore, in the case that the inverse function of $\Gamma$ is calculable, a calculation for a conversion from the image coordinate system to the world coordinates system is executable.

An exemplary $\gamma$ (projection function) for a lens that is symmetrical with respect to the optical axis is represented by the following equations (5) to (9), as a function of the incident angle $\eta$.

$$\gamma = f\sin(\eta) \tag{5}$$

$$\gamma = 2f\sin(\eta/2) \tag{6}$$

$$\gamma = f\eta \tag{7}$$

$$\gamma = 2f\tan(\eta/2) \tag{8}$$

$$\gamma = f\tan(\eta) \tag{9}$$

The equation (5) represents a projection function for orthogonal projection; the equation (6) represents a projection function for equisolid angle projection; the equation (7) represents a projection function for equidistance projection; the equation (8) represents a projection function for stereographic projection; and the equation (9) represents a projection function for a pinhole camera. f denotes a focal length. $\eta$ denotes the incident angle.

The general camera model disclosed in Non-Patent Literature 3 (D. B. Gennery, "Generalized Camera Calibration Including Fish-Eye Lenses", International Journal of Computer Vision, 68, 239-266, 2006) is represented by the following equation (10).

$$\gamma = k_1\eta + k_2\eta^3 + k_2\eta^5 + \tag{10}$$

In the equation (10) above, $\eta$ denotes the incident angle, and each of $k_1$ and $k_2$ denotes a distortion parameter (distortion coefficient) which is a camera parameter.

In Non-Patent Literature 3 above, the general camera model is represented by any polynomial. Since the equation (10) above represents an N-th degree polynomial, calculation of the inverse function requires solving the N-th degree equation. However, only the equation with the degree of four or less can be solved in closed-form. Accordingly, the inverse function of the equation (10) above cannot be obtained systematically. Therefore, conversion from an image coordinate to a sight vector cannot be applied to deep learning necessary for calculation of a network error (loss). From those described above, the inventor in the present disclosure suggests a general fisheye camera model shown by the following equation (11).

$$\gamma = f(\eta + k_1\eta^3) \tag{11}$$

As shown in the equation (11) above, the projection function has a linear term of the incident angle and a cubic term of the incident angle. In the equation (11) above, f denotes the focal length, $\eta$ denotes the incident angle, and $k_1$ denotes the distortion parameter (distortion coefficient) which is a camera parameter.

In the equation (11) above, the focal length f is defined explicitly, unlike Non-Patent Literature 3 above. The focal length f has a physical meaning conveying the scale of an image, and is easily estimated in deep learning. On the other hand, in Non-Patent Literature 3, the focal length f is assumed to have a fixed value of 1 mm, and thus a coefficient in the polynomial is implicitly the focal length.

Since the equation (11) above represents a cubic function for $\eta$, it is necessary to solve the cubic equation for the inverse function. Cardano's formula, which is known as a solving method in closed-form, enables calculation of three roots in complex numbers by use of the cube roots of 1. Since the equation (11) represents a camera model, the focal length f is positive and $k_1$ is a real number. Under this condition, the roots of the equation (11) are those in either (i) or (ii) below.

(i) One real root and two imaginary roots (ii) Three real roots

The sign of the discriminant used in the calculation of three roots in complex numbers by Cardano's formula allows discrimination between (i) and (ii). In the case that the roots of the equation (11) correspond to the roots in (i), the real root $\eta$ is selected. On the other hand, in the case that the roots of the equation (11) correspond to the roots in (ii), the relationship of the magnitude between the three real roots can be calculated; the middle $\eta$ in ascending order of the magnitude of the three roots is selected. The other two roots represent false incident angles $\eta$ which are obtainable from the equation. In the case of three real roots under the condition above, since one real root is negative and the other two real roots are positive, the middle root is appropriate. The negative real root is inappropriate because the incident angle is zero or more. Further, in order for the function in the equation (11) and the inverse function of the equation (11) to be in one-to-one correspondence or bijective, the function in the equation (11) and the inverse function of the equation (11) are required to monotonically increase. The root that is closer to zero among the two positive real roots allows the monotonic increase. Selecting the larger root does not allow the functions to monotonically increase or be bijective.

In deep learning, a real number can be estimated, but the real coordinate space is infinite. Thus, an estimation without determining a range is very inefficient. An approximation of the equation (11) by the third-degree Taylor expansion gives the following equations (12) to (16).

$$\gamma = f(\eta - 1/6 * \eta^3) \tag{12}$$

$$\gamma = f(\eta - 1/24 * \eta^3) \tag{13}$$

$$\gamma = f\eta \tag{14}$$

$$\gamma = f(\eta + 1/12 * \eta^3) \tag{15}$$

$$\gamma = f(\eta + 1/3 * \eta^3) \tag{16}$$

The equation (12) represents a projection function for orthogonal projection; the equation (13) represents a projection function for equisolid angle projection; the equation (14) represents a projection function for equidistance projection; the equation (15) represents a projection function for stereographic projection; and the equation (16) represents a projection function for a pinhole camera.

According to the equations (12) to (16) above, all of the approximated projection systems can be expressed if the distortion parameter $k_1$, which is the coefficient of the cubic term of the incident angle, satisfies $-\frac{1}{6} \leq k_1 \leq \frac{1}{3}$. In other words, the range of $-\frac{1}{6}$ to $\frac{1}{3}$ is a range of $k_1$ to be estimated in deep learning. In the projection function shown in the equation (11) above, the coefficient of the linear term of the incident angle is 1, and the coefficient of the cubic term of the incident angle falls within a range of $-\frac{1}{6}$ to $\frac{1}{3}$. The learning part 62 executes a setting of scaling an output value from 0 to 1 of a sigmoid function, which is an output in DNN. The learning part 62 executes the setting such that the output value of the distortion parameter $k_1$ from DNN falls within the range of $-\frac{1}{6}$ to $\frac{1}{3}$.

In the case that a rotation angle representing the posture of the camera or the focal length is estimated by deep learning, setting the focal length as described below enables an efficient learning. The focal length estimated by DNN preferably falls within a range of $\frac{1}{4}$ to $\frac{1}{2}$ of a vertical length of an image sensor of the camera. The focal length is a distance between the image sensor and the principal point of the lens. The focal length of most of the fisheye lenses on the market falls within a range of 6 mm to 15 mm, in terms of the full-frame image sensor having the vertical length of 24 mm. The tilt angle and the roll angle, which concern the posture parameter of the camera, are estimated in the range of ±90 degrees (Euler angle). In the camera calibration from an image, the pan angle is assumed to be always zero degrees because there is no reference for the pan angle.

A world coordinate on a unit sphere can be calculated from an image coordinate by defining a general camera model represented by the equation (11) and executing a calculation following the procedures described above, which enables learning of DNN by use of a network error (loss) based on the world coordinate. A camera parameter can be thereby calculated with high accuracy from an image distorted by a fisheye camera.

Since the distortion parameter indicative of a distortion of a lens is represented in the projection function of the incident angle to the camera with the degree of four or less, the inverse function of the projection function can be calculated in closed-form. The reference points in an image coordinate system are projected to the world coordinates system by use of the inverse function and the true camera parameter, and the reference points in the image coordinate system are projected to the world coordinates system by use of the inverse function and the estimated camera parameter; DNN can be thereby learned by use of the network error based on the world coordinates system. Thus, the camera parameter can be calculated from an image with high accuracy by inputting the image to DNN learned by a deep learning.

Modifications

The camera parameter calculation device and the learning device according to one or more aspects of the present disclosure are described above with reference to the embodiment, but the present disclosure is not limited to the embodiment. Various modifications conceivable by one skilled in the art and a combination of constituents in different embodiments are included within the scope of the one or more aspects of the present disclosure as long as those do not deviate from the concept of the present disclosure.

In the embodiments described above, each constituent is constituted by dedicated hardware, or may do performance by executing a software program appropriate for each constituent. Each constituent may do performance by the reading and execution by a program executing part such as a CPU or a processor of a software program stored in a recording medium such as a hard disk or a semiconductor memory.

A part or all of the functions of the device according to the embodiments of the present disclosure are carried out using a Large Scale Integration (LSI) that is typically an integrated circuit. The respective functions may be individually performed by single chips. Alternatively, a part or all of the functions may be performed by a single chip. Additionally, circuit integration is not limited to an LSI and may be realized using a dedicated circuit or a general-purpose processor. A Field Programmable Gate Array (FPGA) that can be programmed after LSI production or a reconfigurable processor that allows connection or reconfiguration of circuit cells inside an LSI after LSI production may be used.

A part or all of the functions of the device according to the embodiments of the present disclosure may be carried out by execution of a program by a processor such as a CPU.

All of the numbers mentioned above are merely examples for describing the present disclosure specifically, which the present disclosure is not limited to.

The order in which each of the steps is executed, shown in the above-mentioned flowchart, is merely an example for describing the present disclosure specifically, and may be varied as long as the similar effects can be exerted. Some of the above-mentioned steps may be executed simultaneously (in parallel) with another step.

The techniques in the present disclosure enable a highly accurate calculation of a camera parameter from an image, and thus are useful as a technique of learning deep neural networks for calculating a camera parameter from an image and a technique of calculating a camera parameter from an image.

The invention claimed is:

1. A learning device comprising:
an image acquisition part for acquiring an image taken by a camera;
a camera parameter acquisition part for acquiring a true camera parameter of the camera;
a learning part for performing a deep learning of deep neural networks using the image acquired by the image acquisition part and the true camera parameter acquired by the camera parameter acquisition part; and
an output part for outputting the deep neural networks learned in the learning part, wherein
the learning part
estimates a camera parameter including a distortion parameter indicative of a distortion of a lens assumed to be symmetrical with respect to the optical axis for a projection function of an incident angle to the camera with a degree of four or less, and a posture parameter indicative of a posture of the camera by inputting the image to the deep neural networks,
calculates an inverse function of the projection function in closed-form,
calculates a plurality of true values by projecting a plurality of reference points on the image to a world coordinates system by use of the inverse function and the true camera parameter,
calculates a plurality of estimative values by projecting the plurality of reference points to the world coordinates system by use of the inverse function and the estimated camera parameter,
calculates a network error indicative of an error between the true camera parameter and an estimation result of the deep neural networks about the camera parameter, on the basis of sets of the respective true values and the respective estimative values, and learns a parameter of the deep neural networks so as to minimize the calculated network error.

2. The learning device according to claim 1, wherein a view angle of the camera is 180 degrees or more.

3. The learning device according to claim 1, wherein the projection function has a linear term of the incident angle and a cubic term of the incident angle.

4. The learning device according to claim 3, wherein a coefficient of the linear term of the incident angle is 1, and a coefficient of the cubic term of the incident angle falls within a range of $-\frac{1}{6}$ to $\frac{1}{3}$.

5. The learning device according to claim 1, wherein the camera parameter further includes a focal length of the camera, and the focal length estimated by the deep neural networks falls within a range of $\frac{1}{4}$ to $\frac{1}{2}$ of a vertical length of an image sensor of the camera.

6. The learning device according to claim 1, wherein the plurality of true values is a plurality of first world coordinate points obtained by projecting the plurality of reference points to the world coordinates system by use of the inverse function and the true camera parameter, the plurality of estimative values is a plurality of second world coordinate points obtained by projecting the plurality of reference points to the world coordinates system by use of the inverse function and the estimated camera parameter, and the learning part calculates the network error on the basis of a distance in each of sets of the respective first world coordinate points and the respective second world coordinate points.

7. The learning device according to claim 1, wherein the plurality of true values is a plurality of first unit sight vectors obtained by projecting the plurality of reference points to the world coordinates system by use of the inverse function and the true camera parameter, the plurality of estimative values is a plurality of second unit sight vectors obtained by projecting the plurality of reference points to the world coordinates system by use of the inverse function and the estimated camera parameter, and the learning part calculates the network error on the basis of an angle in each of sets of the respective first unit sight vectors and the respective second unit sight vectors.

8. The learning device according to claim 1, wherein the plurality of true values is a plurality of first unit sight vectors obtained by projecting the plurality of reference points to the world coordinates system by use of the inverse function and the true camera parameter, the plurality of estimative values is a plurality of second unit sight vectors obtained by projecting the plurality of reference points to the world coordinates system by use of the inverse function and the estimated camera parameter, and the learning part calculates the network error on the basis of a distance in each of sets of: a plurality of first intersections of the respective first unit sight vectors and a unit sphere; and a plurality of second intersections of the respective second unit sight vectors and the unit sphere.

9. A learning method, by a computer, comprising:

acquiring an image taken by a camera;

acquiring a true camera parameter of the camera;

performing a deep learning of deep neural networks using the acquired image and the acquired true camera parameter; and outputting the learned deep neural networks, wherein in the learning of the deep neural networks, a camera parameter including a distortion parameter indicative of a distortion of a lens assumed to be symmetrical with respect to the optical axis for a projection function of an incident angle to the camera with a degree of four or less, and a posture parameter indicative of a posture of the camera is estimated by inputting the image to the deep neural networks, an inverse function of the projection function is calculated in closed-form, a plurality of true values are calculated by projecting a plurality of reference points on the image to a world coordinates system by use of the inverse function and the true camera parameter, a plurality of estimative values are calculated by projecting the plurality of reference points to the world coordinates system by use of the inverse function and the estimated camera parameter, a network error indicative of an error between the true camera parameter and an estimation result of the deep neural networks about the camera parameter is calculated on the basis of sets of the respective true values and the respective estimative values, and a parameter of the deep neural networks is learned so as to minimize the calculated network error.

10. A non-transitory computer readable recording medium storing a learning program causing a computer to serve as:

an image acquisition part for acquiring an image taken by a camera;

a camera parameter acquisition part for acquiring a true camera parameter of the camera;

a learning part for performing a deep learning of deep neural networks using the image acquired by the image acquisition part and the true camera parameter acquired by the camera parameter acquisition part; and an output part for outputting the deep neural networks learned in the learning part, wherein the learning part estimates a camera parameter including a distortion parameter indicative of a distortion of a lens assumed to be symmetrical with respect to the optical axis for a projection function of an incident angle to the camera with a degree of four or less, and a posture parameter indicative of a posture of the camera by inputting the image to the deep neural networks, calculates an inverse function of the projection function in closed-form, calculates a plurality of true values by projecting a plurality of reference points on the image to a world coordinates system by use of the inverse function and the true camera parameter, calculates a plurality of estimative values by projecting the plurality of reference points to the world coordinates system by use of the inverse function and the estimated camera parameter, calculates a network error indicative of an error between the true camera parameter and an estimation result of the deep neural networks about the camera parameter, on the basis of sets of the respective true values and the respective estimative values, and learns a parameter of the deep neural networks so as to minimize the calculated network error.

11. A camera parameter calculation device comprising:

an image acquisition part for acquiring an image taken by a camera;

an estimation part for estimating a camera parameter of the camera by inputting the image acquired by the image acquisition part to deep neural networks learned by a deep learning; and an output part for outputting the camera parameter estimated by the estimation part, wherein in the learning of the deep neural networks, a learning-use image is acquired, a true camera parameter of a camera used for taking the learning-use image is acquired, a camera parameter including a distortion parameter indicative of a distortion of a lens assumed to be symmetrical with respect to the optical axis for a projection function of an incident angle to the camera used for taking the learning-use image with a degree of four or less, and a posture parameter indicative of a posture of the camera is estimated by inputting the learning-use image to the deep neural networks, an inverse function of the projection function is calculated in closed-form, a plurality of true values are calculated by projecting a plurality of reference points on the learning-use image to a world coordinates system by use of the inverse function and the true camera parameter, a plurality of estimative values are calculated by projecting the plurality of reference points to the world coordinates system by use of the inverse function and the estimated camera parameter, a network error indicative of an error between the true camera parameter and an estimation result of the deep neural networks about the camera parameter is calculated on the basis of sets of the respective true values and the respective estimative values, and a parameter of the deep neural networks is learned so as to minimize the calculated network error.

12. A camera parameter calculation method, by a computer, comprising:

acquiring an image taken by a camera;

estimating a camera parameter of the camera by inputting the image taken by the camera to deep neural networks learned by a deep learning; and outputting the camera parameter estimated by the deep neural networks, wherein in the learning of the deep neural networks, a learning-use image is acquired, a true camera parameter of a camera used for taking the learning-use image is acquired, a camera parameter including a distortion parameter indicative of a distortion of a lens assumed to be symmetrical with respect to the optical axis for a projection function of an incident angle to the camera used for taking the learning-use image with a degree of four or less, and a posture parameter indicative of a posture of the camera is estimated by inputting the learning-use image to the deep neural networks, an inverse function of the projection function is calculated in closed-form, a plurality of true values are calculated by projecting a plurality of reference points on the learning-use image to a world coordinates system by use of the inverse function and the true camera parameter, a plurality of estimative values are calculated by projecting the plurality of reference points to the world coordinates system by use of the inverse function and the estimated camera parameter, a network error indicative of an error between the true camera parameter and an estimation result of the deep neural networks about the camera parameter is calculated on the basis of sets of the respective true values and the respective estimative values, and a parameter of the deep neural networks is learned so as to minimize the calculated network error.

13. A non-transitory computer readable recording medium storing a camera parameter calculation program causing a computer to serve as:

an image acquisition part for acquiring an image taken by a camera;

an estimation part for estimating a camera parameter of the camera by inputting the image acquired by the image acquisition part to deep neural networks learned by a deep learning; and an output part for outputting the camera parameter estimated by the estimation part, wherein in the learning of the deep neural networks, a learning-use image is acquired, a true camera parameter of a camera used for taking the learning-use image is acquired, a camera parameter including a distortion parameter indicative of a distortion of a lens assumed to be symmetrical with respect to the optical axis for a projection function of an incident angle to the camera used for taking the learning-use image with a degree of four or less, and a posture parameter indicative of a posture of the camera is estimated by inputting the learning-use image to the deep neural networks, an inverse function of the projection function is calculated in closed-form, a plurality of true values are calculated by projecting a plurality of reference points on the learning-use image to a world coordinates system by use of the inverse function and the true camera parameter, a plurality of estimative values are calculated by projecting the plurality of reference points to the world coordinates system by use of the inverse function and the estimated camera parameter, a network error indicative of an error between the true camera parameter and an estimation result of the deep neural networks about the camera parameter is calculated on the basis of sets of the respective true values and the respective estimative values, and a parameter of the deep neural networks is learned so as to minimize the calculated network error.

* * * * *